(12) United States Patent
Reynolds et al.

(10) Patent No.: US 10,142,561 B2
(45) Date of Patent: *Nov. 27, 2018

(54) VIRTUAL-SCENE CONTROL DEVICE

(71) Applicant: LUCASFILM ENTERTAINMENT COMPANY LTD., San Francisco, CA (US)

(72) Inventors: Spencer Reynolds, San Francisco, CA (US); Michael Sanders, San Francisco, CA (US); Kevin Wooley, San Francisco, CA (US); Steve Sullivan, Redmond, WA (US); Adam Schnitzer, Petaluma, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/463,908

(22) Filed: Mar. 20, 2017

(65) Prior Publication Data

US 2017/0195527 A1  Jul. 6, 2017

Related U.S. Application Data

(63) Continuation of application No. 12/982,437, filed on Dec. 30, 2010, now Pat. No. 9,626,786.
(Continued)

(51) Int. Cl.
*H04N 5/262* (2006.01)
*H04N 5/222* (2006.01)
(Continued)

(52) U.S. Cl.
CPC ......... *H04N 5/2621* (2013.01); *G06F 3/0202* (2013.01); *G06F 3/0346* (2013.01);
(Continued)

(58) Field of Classification Search
CPC .... H04N 5/2621; H04N 5/232; H04N 5/2224; G06F 3/041; G06F 3/04815; G06T 13/20;
(Continued)

(56) References Cited

U.S. PATENT DOCUMENTS 3,916,094 A 10/1975 Marrone
5,697,757 A 12/1997 Lindsay
(Continued)

FOREIGN PATENT DOCUMENTS

GB 2442602 A 4/2008
JP 2002307337 A 10/2002
JP 2004225724 A 8/2004

OTHER PUBLICATIONS

"Fiduciary marker", Wikipedia, Available online at https://en.wikipedia.org/wiki/Fiduciary_marker, 2008, 2 pages.
(Continued)

*Primary Examiner* — Xuemei Zheng
(74) *Attorney, Agent, or Firm* — Kilpatrick Townsend & Stockton LLP

(57) ABSTRACT

A handheld device includes: an input control configured to control and modify a virtual scene including a virtual camera; and a display that shows a representation of the controlled and modified virtual scene generated by the virtual camera. A system includes: a computer system configured to execute program instructions for generating a virtual scene including a virtual camera; and handheld device configured to communicate with the computer system for controlling and modifying the virtual scene, the handheld device comprising: an input control configured to control and modify the virtual scene; and a display that shows a representation of the controlled and modified virtual scene generated by the virtual camera.

19 Claims, 10 Drawing Sheets

Related U.S. Application Data

(60) Provisional application No. 61/365,644, filed on Jul. 19, 2010, provisional application No. 61/365,667, filed on Jul. 19, 2010.

(51) Int. Cl.

| | | |
|---|---|---|
| *G06F 3/0481* | (2013.01) | |
| *G06F 3/02* | (2006.01) | |
| *G06F 3/0346* | (2013.01) | |
| *G06F 3/0362* | (2013.01) | |
| *G06F 3/041* | (2006.01) | |
| *G06F 3/0488* | (2013.01) | |
| *G06T 13/20* | (2011.01) | |
| *G06T 19/00* | (2011.01) | |
| *G06T 15/20* | (2011.01) | |
| *H04N 5/232* | (2006.01) | |
| *G11B 27/00* | (2006.01) | |
| *G06T 7/70* | (2017.01) | |
| *G06T 7/00* | (2017.01) | |

(52) U.S. Cl.
CPC ............ *G06F 3/0362* (2013.01); *G06F 3/041* (2013.01); *G06F 3/04815* (2013.01); *G06F 3/04886* (2013.01); *G06T 7/004* (2013.01); *G06T 7/70* (2017.01); *G06T 13/20* (2013.01); *G06T 15/20* (2013.01); *G06T 15/205* (2013.01); *G06T 19/003* (2013.01); *G11B 27/00* (2013.01); *H04N 5/2224* (2013.01); *H04N 5/232* (2013.01); *H04N 5/23203* (2013.01); *H04N 5/2628* (2013.01); *G06T 2215/16* (2013.01)

(58) Field of Classification Search
CPC ....... G06T 15/20; G06T 15/205; G06T 19/00; G06T 19/003; G06T 2215/16; G09G 5/14
See application file for complete search history.

(56) References Cited

U.S. PATENT DOCUMENTS

| | | | |
|---|---|---|---|
| 6,331,861 B1 | 12/2001 | Gever et al. | |
| 6,517,207 B2 | 2/2003 | Chapman et al. | |
| 7,403,220 B2 | 7/2008 | MacIntosh et al. | |
| 7,463,304 B2 | 12/2008 | Murray | |
| 7,625,286 B2 | 12/2009 | Hamada et al. | |
| 7,628,700 B2 | 12/2009 | Baseflug et al. | |
| 8,079,950 B2 | 12/2011 | Niemeyer et al. | |
| 8,194,191 B1 | 6/2012 | Mann et al. | |
| 8,310,663 B2 * | 11/2012 | Mack ................ | G03B 13/22 356/124 |
| 8,817,078 B2 | 8/2014 | Thiel et al. | |
| 2003/0025802 A1 | 2/2003 | Mayer, Jr. et al. | |
| 2005/0018053 A1 | 1/2005 | Suga et al. | |
| 2005/0036036 A1 | 2/2005 | Stevenson et al. | |
| 2005/0186884 A1 | 8/2005 | Evans et al. | |
| 2005/0187015 A1 | 8/2005 | Suzuki et al. | |
| 2006/0038890 A1 | 2/2006 | MacIntosh et al. | |
| 2006/0090022 A1 | 4/2006 | Flynn et al. | |
| 2006/0282873 A1 | 12/2006 | Zalewski et al. | |
| 2007/0106307 A1 | 5/2007 | Bodduluri et al. | |
| 2007/0174774 A1 | 7/2007 | Lerman et al. | |
| 2007/0270215 A1 | 11/2007 | Miyamoto et al. | |
| 2008/0015017 A1 | 1/2008 | Ashida et al. | |
| 2008/0094358 A1 | 4/2008 | Sullivan | |
| 2008/0319252 A1 | 12/2008 | Chapman et al. | |
| 2009/0002365 A1 | 1/2009 | Kurabayashi et al. | |
| 2009/0015679 A1 | 1/2009 | Hayakawa et al. | |
| 2009/0017911 A1 | 1/2009 | Miyazaki et al. | |
| 2009/0069084 A1 | 3/2009 | Reece et al. | |
| 2009/0089157 A1 | 4/2009 | Narayanan et al. | |
| 2009/0102841 A1 | 4/2009 | Clavadetscher et al. | |
| 2009/0102861 A1 | 4/2009 | Turcotte et al. | |
| 2009/0105994 A1 | 4/2009 | Mandolini et al. | |
| 2009/0284553 A1 | 11/2009 | Seydoux et al. | |
| 2009/0309986 A1 | 12/2009 | Mayer et al. | |
| 2010/0026809 A1 | 2/2010 | Curry et al. | |
| 2010/0045666 A1 | 2/2010 | Kornmann et al. | |
| 2010/0045667 A1 | 2/2010 | Kornmann et al. | |
| 2010/0062817 A1 | 3/2010 | Seydoux et al. | |
| 2010/0208033 A1 | 8/2010 | Edge et al. | |
| 2010/0253676 A1 | 10/2010 | Mumbauer et al. | |
| 2011/0026014 A1* | 2/2011 | Mack ................... | G03B 13/22 356/124 |
| 2012/0109377 A1 | 5/2012 | Stern et al. | |
| 2012/0223967 A1 | 9/2012 | Mann et al. | |

OTHER PUBLICATIONS

"Product Demo—Craft Camera Tools and advanced Tank Animation", Craftanimations, available online at http://www.youtube.com/watch?v=NEENfbNdAh4, Jun. 4, 2009, retrieved Mar. 20, 2013, Mar. 20, 2013.

U.S. Appl. No. 12/982,426, "Advisory Action", dated May 30, 2013, 3 pages.

U.S. Appl. No. 12/982,426, "Final Office Action", dated Mar. 28, 2013, 16 pages.

U.S. Appl. No. 12/982,426, "Non Final Office Action", dated Apr. 8, 2014, 17 pages.

U.S. Appl. No. 12/982,426, "Non-Final Office Action", dated Sep. 7, 2012, 16 pages.

U.S. Appl. No. 12/982,437, "Final Office Action", dated Mar. 27, 2013, 16 pages.

U.S. Appl. No. 12/982,437, "Final Office Action", dated Oct. 16, 2015, 28 pages.

U.S. Appl. No. 12/982,437, "Non Final Office Action", dated Jul. 18, 2014, 19 pages.

U.S. Appl. No. 12/982,437, "Non-Final Office Action", dated Apr. 1, 2016, 27 pages.

U.S. Appl. No. 12/982,437, "Non-Final Office Action", dated Jun. 26, 2015, 27 pages.

U.S. Appl. No. 12/982,437, "Notice of Allowance", dated Dec. 14, 2016, 14 pages.

Ashcraft, "A New Era of Game Broadcasting", Downloaded from the internet at:http://kotaku.com/152501/a-new-era-of-game-broadcasting, Feb. 3, 2006, 2 pages.

AU2009248424, "First Examiner Report", dated Jan. 25, 2013, 3 pages.

Bridgeport, "Forward kinematics", Available online at http://www.1bpt.bridgeport.edu/sed/risc/html/sim/node6.html, 1997, 2 pages.

Digi-Lab, "Voodoo Camera Tracker: A tool for the integration of virtual and real scenes", Available online at http://digilab.uni-hannover.de/docs/manual.html, Aug. 31, 2010, 18 pages.

Ditzian, "Exclusive: Robert Zemeckis Indicates He'll Use Performance-Capture and 3-D in 'Roger Rabbit' Sequel", Available online at http://moviesblog.mtv.com/2009/11/03/exclusive-robert-zemeckis-indicates-hell-use-performance-capture-and-3-d-in-roger-rabbit-seguel, Nov. 3, 2009, 3 pages.

Elliott, "Elliott Animation Reaps Big Dividends with Craft Camera Tools for Gamecaster's GCS3 Virtual Camera Control Hardware", available online at http://web.archive.org/web/20090525104938/http://www.gamecaster.com/news/-Elliott-Animation-Reaps-Big-Dividends -with-Craft -Camera-Tools-for -Gamecasters-GCS3-Virtual-Came ra -Control-Hardware-, May 25, 2009.

Even, "All These Worlds are Yours: Leslie Ekker on VFX for '2010' the Movie, Not the Year", Available online at http://idesignyoureyes.com/2010/OI/page/2, Jan. 12, 2010, 7 pages.

GB0921667.2, "International Search Report and Written Opinion", dated Feb. 12, 2010, 3 pages.

Kuang, "Motion-Capture Invention Promises WETA Digital Effects on a YouTube Budget", Available online at http://www.fastcompany.com/blog/cliff-kuang/designinnovation/new-invention-slashes-cost-motion-capture-99, Apr. 23, 2009, 3 pages.

Lntersense, Inc., "Intersense, Inc. Unveils Proof-of-Concept VCam Lite Handheld Virtual Camera System at SIGGRAPH 2009", Available online at http://imagingreporter.com/2009/08/intersense-inc-

(56) References Cited

OTHER PUBLICATIONS unveils-proof-of-concept-vcam-lite-handheldvirtual-camera-system-at-siggraph-2009, Aug. 4, 2009, 1 page.

Lsilon Systems LLC, "Lightstorm Entertainment Uses Isilon IQ to Power Production of "Avatar"", Available online at http//www.isilon.com/press-release/lightstormentertainment-uses-isilon-ig-power-production-avatar, Dec. 18, 2009, 1 page.

Panavision, "Technocrane 20", Available online at http://www.panavision.com/product detail.phpcat=103&id=11O&imgid=158, 2004, 2 pages.

Parrot Ar.Drone, "How Does it Work", Available online at http://ardrone.parrot.com/parrotar-drone/usa/how-does-it-work, 2012, 1 page.

Six Apart, LTD., "New Technology in AVATAR—Performance Capture, Fusion Camera System, and Simui-Cam", Available online at http://avatarblog.typepadad.com/avatarblog/2010/05/new-technology-in-avatar-performance-capture-fusion-camera-system-and-simulcam.html, May 30, 2010, 2 pages.

Suanez, "Wacom Cintiq Reviewed in Deep", Available online at http:www.sosfactory.com/blog/articles/wacom-cintig-review/, Jun. 18, 2008, 18 pages.

\* cited by examiner

VIRTUAL-SCENE CONTROL DEVICE

CROSS-REFERENCES TO RELATED APPLICATIONS

This application is a continuation of U.S. patent application Ser. No. 12/982,437, filed Dec. 30, 2010; which claims the benefit of U.S. Provisional Application Nos. 61/365,644 filed on Jul. 19, 2010 and 61/365,667 filed on Jul. 19, 2010. The disclosures of each are hereby incorporated by reference in their entirety.

TECHNICAL FIELD

This document relates to a virtual-scene control device.

BACKGROUND OF THE INVENTION

While advancements in computer technology have been made in recent years, many filmmakers active today have used traditional camera equipment on most if not all of their work. To those professionals, using computer-generated tools in creating a video or an animation remains unfamiliar. It can therefore be difficult to accomplish in the virtual world the things that they are used to creating with standard cameras, such as setting camera angles and choosing camera paths. In a sense, it can be said that some filmmakers speak in traditional language that does not directly translate artistically into computer-generated imagery.

Movie production that involves computer-generated images (CGI) can tend to look animated and require extensive non-realtime artistry. For example, it can take days to weeks for teams of artists to layout a scene, set and block computer-generated cameras, assets and composition. 2D story boards are sometimes generated, but they may not convey enough 3D information. 3D animatics are sometimes used, but they may be rudimentary and limiting in capability and fidelity.

BRIEF SUMMARY OF THE INVENTION

The invention relates to a virtual-scene control device.

In a first aspect, a handheld device includes: an input control configured to control and modify a virtual scene including a virtual camera; and a display that shows a representation of the controlled and modified virtual scene generated by the virtual camera.

In a second aspect, a system includes: a computer system configured to execute program instructions for generating a virtual scene including a virtual camera; and handheld device configured to communicate with the computer system for controlling and modifying the virtual scene, the handheld device comprising: an input control configured to control and modify the virtual scene; and a display that shows a representation of the controlled and modified virtual scene generated by the virtual camera.

Implementations can include any or all of the following features. The input control comprises at least one virtual button configured to be presented on the display, the virtual button configured to control an aspect on an application program that generates the virtual scene and the virtual camera. The display comprises a touchscreen for control or modification of the virtual scene. The handheld device has a camera form factor. The handheld device has a tablet form factor. The handheld device further includes at least one handle attached to a body of the handheld device. The handle includes at least one physical input mechanism for controlling or modifying the virtual scene. The handheld device is configured so that motion of the handheld device is captured and used for controlling or modifying the virtual scene, wherein the representation on the display is updated based on the captured motion.

The handheld device further includes motion capture markers selectively attachable to the handheld device, wherein an outer motion capture system is configured to register the motion of the handheld device using the motion capture markers. The motion capture markers include marker rods of different lengths and wherein the handheld device further comprises holders for attaching the marker rods, the holders oriented on the handheld device so that the marker rods extend in each of three spatial dimensions. The handheld device further includes at least one sensor on the handheld device configured to generate a signal for registering the motion of the handheld device. The handheld device is modular and configured to have multiple modules selectively attached to a body of the handheld device, each of the modules providing at least one user-operable function for controlling or modifying the virtual scene.

The input control comprises at least one physical input mechanism mounted on a body of the handheld device for controlling or modifying the virtual scene. The physical input mechanism comprises a lens ring for controlling or modifying the virtual camera. The physical input mechanism comprises control buttons on the body of the handheld device, at least two of the control buttons located in finger indentations on the body for placement of a user's fingers. The physical input mechanism comprises buttons arranged in a row on the body of the handheld device, and at least one scroll wheel between adjacent buttons. The physical input mechanism comprises a mode control mounted on the body of the handheld device, the mode control comprising mode settings and respective custom settings for multiple users. The handheld device further includes: optics comprising at least one lens mounted on a body of the handheld device; and an electronic light sensor mounted to the housing for registering a physical-scene image captured by the lens.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF THE INVENTION

In some implementations, a virtual set camera controller functions as a director-friendly interaction device for use with real-time, CGI-driven scenes. While the virtual scene is generated (and possibly manipulated) from a remote workstation, the camera controller is intended to act as a stand-alone device, allowing the director full control over the scene. Scene interaction will include playback controls, timeline manipulation with keying, and asset management. Immediate usage scenarios include pre-visualization scene design and camera blocking, motion capture scene interaction (real-time and/or prerecorded), etc. The device is also designed in a modular sense, such that any (non-critical) sub-component of the device can be added or removed as the user sees fit. These modules can also be utilized to augment the functionality of any stand-alone device such that the device's functionality can be extended into the virtual realm.

Figure 1:
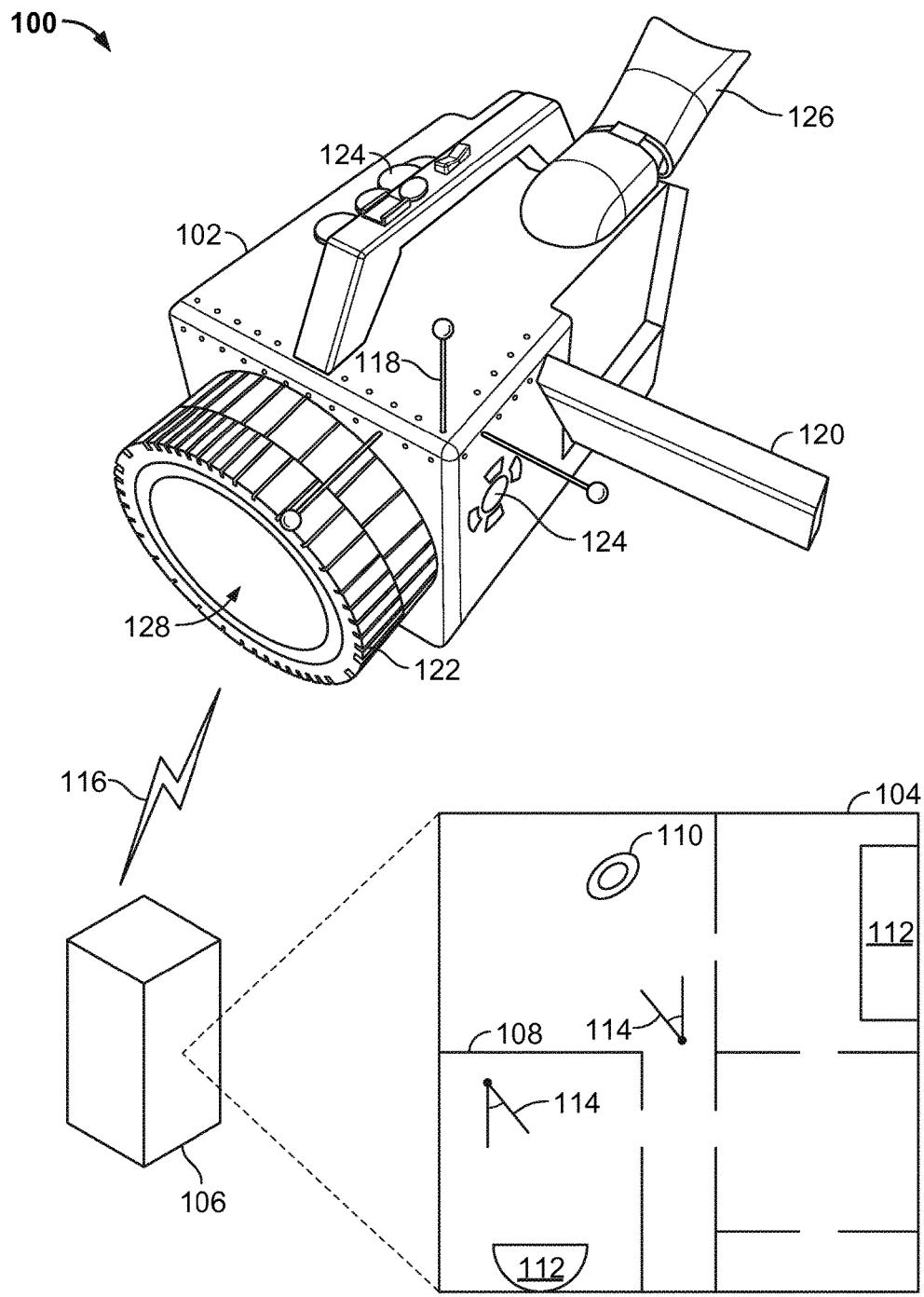
FIG. 1 shows an example of a system with a handheld device for controlling a virtual scene.

FIG. 1 shows an example of a system 100 with a handheld device 102 for controlling a virtual scene 104. Here, the handheld device 102 has the form factor of a camera (e.g., a camcorder), which can give a realistic and familiar feel to the user operating the handheld device. The handheld device can have other form factors in some implementations, such as those form factor examples that will be described later herein.

In short, the virtual scene 104 is generated by one or more application programs in a computer system 106. For example, the virtual scene can be the CGI framework, forming a software model of an intended movie set, by which video animations are generated. Animation created using the virtual scene 104 can serve either as augmentation to other video content (e.g., traditional video shot on a physical stage or set) or as video content in its own right (e.g., in an animation motion picture). The virtual scene 104 can be stored in the computer system 106 in any suitable format including, but not limited to, renderable geometry or another technique for maintaining and manipulating visual objects.

Here, the virtual scene 104 is schematically shown to include a layout 108 to define a 3D space, seen from above. In some implementations, the layout 108 can form an indoor environment (e.g., a house or caves) in which one or more characters 110 can be controlled. For example, one or more of the character(s) 110 can move according to a predefined script (e.g., to perform acts that are part of a story). As another example, one or more of the character(s) can be programmed with logic to act in response to outer stimuli or other events, such as the presence or absence of other characters, assets, virtual cameras, etc.

One or more assets 112 (e.g., furniture, natural objects, landscape, etc.) can be defined in the virtual scene 104. For example, an asset can be an immovable object (e.g., a lake), a movable object (e.g., a book), or a self-propelled object (e.g., a car). To define the 3D space, the layout 108 also includes a third dimension (not visible in the illustration), and characters, assets or other features can be positioned or move at arbitrary heights or depths in the layout depending on the design.

The virtual scene 104 can be used to generate images or video sequences. For this purpose, one or more virtual cameras 114 can be defined in the virtual scene 104. In some implementations, a virtual camera is an abstract definition including a point in space and a direction for the field of view. For example, the point represents the node point inside the "lens" of the virtual camera where "light rays" converge. In a virtual scene, the light rays are represented by virtual rays modeled to have properties similar to light; e.g., color, intensity, duration, propagation, reflection, refraction, etc. The field of view defines the "direction" in the virtual space that the virtual camera is facing. For example, one of the virtual cameras 114 here faces the character 110 and another faces one of the assets 112. When a virtual camera is active, the computer system 106 registers an image or a video sequence based on the virtual rays that the camera receives. For example, by using multiple virtual cameras, the same scene or event can be captured from more than one perspective. Images and/or video sequences can later be assembled or merged.

The handheld device 102 communicates with the computer system 106 using one or more connections 116, such as through a wired or wireless network connection. The handheld device 102 can control the computer system in one or more regards, and can receive and respond to output from the computer system. For example, the handheld device can generate instructions for an application program that creates and manages the virtual scene 104. Such instructions can control any suitable aspect of the virtual scene, such as the layout 108, the character(s) 110, the assets 112 and/or the virtual camera(s) 114. For example, the handheld device can control which of the virtual cameras is active (i.e., which camera's output is to be received), placement and/or movement of the virtual camera.

The handheld device 102 can generate control instructions for the virtual scene 104 and/or the virtual cameras 114 based on user input through any suitable technique. In some implementations, motion tracking of the handheld device is used. That is, the motion of the handheld device in one or more dimensions can be captured and used for controlling or modifying the virtual scene. For example, the handheld device can have motion capture markers 118 designed to be detected by an external tracking system, such as by the computer system 106.

Here, the motion capture markers include light-colored marker spheres mounted on rods. In some implementations, the motion capture markers are selectively attachable to the handheld device, for example by holders. Any suitable fastening technique can be used including, but not limited to, threads, magnets, adhesive, bayonet mounts, friction fit. Here, the rods of the motion capture markers extend in each of three spatial dimensions, for tracking the handheld device's 3D movement. In some implementations, rods of different lengths can be used. For example, longer rods can facilitate better perception of 3D movement when the handheld device is further away from the external tracking system.

In some implementations, other tracking techniques can be used. For example, the handheld device 102 can be provided with one or more accelerometers. Based on a calibrated starting position (e.g., the origin in an arbitrary coordinate system), the accelerometer(s) can detect the device's movement and from this its location, orientation and/or velocity can be determined. As other example, magnetic or audio sensors can be used to detect the position and/or movement of the handheld device. As yet another example, an optical detector (e.g., a camera) can be mounted on, or be integrated in, the handheld device to capture its motion. The signals from any such tracking devices or sensors can be processed, either on the handheld device 102 using a suitable algorithm, or in the computer system 106, and the resulting information can be used to generate the instructions for controlling the virtual scene 104 and/or the virtual camera(s) 114.

The handheld device 102 here includes a display 120 for presenting images, videos and/or other information to the user. In some implementations, the handheld device receives a real time output of the virtual scene 104 through the connection 116, such as video imagery generated by one or more of the virtual cameras 114. The display 120 can then present such image(s) to the user. For example, when the motion of the handheld device is captured in real time and used to control a virtual camera, the image presentation can give the user a realistic experience where panning, tilting and/or yawing the handheld device is translated into corresponding manipulations of the virtual camera. Any suitable display technology can be used including, but not limited to, LCD or LED. In some implementations, the display 120 features touchscreen functionality, such as will be described in examples below.

In some implementations, the handheld device 102 has a camera form factor. For example, the handheld device can have a body generally in shape of a solid rectangle (e.g., a box), a lens-like portion near the front end, an ocular or eyepiece near the rear end (i.e., facing the user), a handle, controls, and the display 120 mounted on the body. Other camera form factors can be used. Here, the handheld device includes a lens ring 122, controls 124 on the top and on the side(s), and an eyepiece 126. For example, the lens and/or eyepiece may be less prominent or omitted (e.g., to resemble a camera where the lens and/or eyepiece is integrated into the main housing).

One or more mechanical features on the handheld device can perform a function. In some implementations, a mechanical input is translated into a suitable electronic format (e.g., into a digital command or data) and forwarded to the computer system 106 for controlling the virtual scene 104 and/or the virtual camera(s) 114. For example, one or more of the lens ring 122 can be mounted in rotatable and/or slidable engagement with the body of the handheld device. The setting of such ring(s) can be translated into corresponding digital information, for example to represent a choice of zoom level or focus length (i.e., continuous alternative values), or a choice among predefined aspect ratios (i.e., discrete alternative values). In some implementations, other camera features can be controlled by the lens ring and/or the eyepiece 126 including, but not limited to, lens choice, optical filters or shutter angle. In various implementations, the controls on the handheld device can be all mechanical controls, or all virtual controls (e.g., virtual commands that the user issues under guidance the display 120), or a combination of both.

In some implementations, the handheld device 102 has essentially no "traditional" camera functions. For example, the body of the handheld device in such implementations can have the input control(s), a communication module for the connection 116 (e.g., a wireless transmitter or a network interface card), the display 120, and motion capture technology (e.g., by sensor(s) or the motion capture markers 118). Some or all of such components can be controlled by a processor in the handheld device executing suitable instructions from a computer-readable medium (e.g., a memory or a hard drive).

In other implementations, however, the handheld device 102 can perform one or more traditional camera functions. For example, optics 128 such as one or more lenses, can be mounted on the handheld device, and can focus incoming light rays from a physical scene onto a suitable component, such as a film medium or an electronic light sensor. Still images and/or video sequences can be recorded. Such image (s) can be stored in the handheld device and optionally transferred to the computer system 106, for example to generate a composite image from the physical scene and the virtual scene.

In some implementations, the handheld device 102 is modular. For example, the handheld device can be configured to have one or more modules selectively attached to its body. Each module can provide at least one user-operable function for controlling or modifying the virtual scene 104 and/or the virtual camera 114. For example, the lens ring 122 can be selectively removable from the housing, wherein the lens ring controls a camera function when mounted (e.g., zoom level). In some implementations, the optics 128 and corresponding light sensor can be modular, either integral with the modular lens ring or as a separate module. As another example, the eyepiece 126, display 120, controls 118 and/or a motion capturing component can be in module form to be attached to and removed from the handheld device as needed.

The handheld device can be equipped with suitable sensors or connectors so that the presence or absence of a particular component is detected and the device can act accordingly. If a particular module component is not mounted, the corresponding function(s) can be disabled or deactivated by the handheld device and/or by the computer system 106. As another example, the corresponding function may be operative through another input control, such as a touchscreen on the display 120.

FIGS. 2A-B, 3A-B, 4A-B, 5A-B, 6A-B and 7A-B show examples of controls 200 on a handheld device. Here, controls 200 include a button 210, a multi-way control in form of a ring 220 (e.g., having at least up, down, left and right positions), and another control in form of buttons 230 (e.g., respective up, down, left and right buttons). These controls can be arranged in any pattern, such as essentially as shown here. For example, when the user holds the handheld device with one hand (e.g., the right hand), these controls can be located on a side surface of the handheld device (e.g., the left side) for access with the user's other hand. The controls 200 here also include a scroll mechanism in form of a wheel 240, and multiple buttons 250 (e.g., first, second and third buttons). These controls can be arranged in any pattern, such as essentially as shown here. For example, these controls can be located on a top surface of the handheld device for access with fingers of the hand holding the device.

Figure 2A:
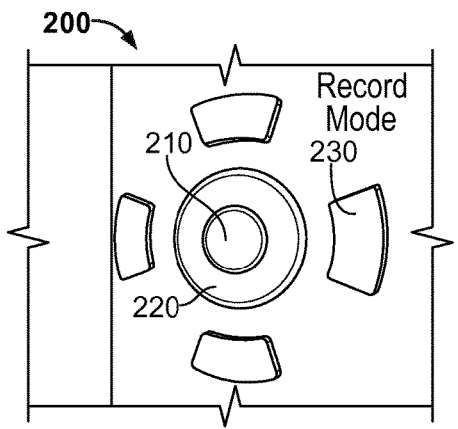
FIGS. 2A-B, 3A-B, 4A-B, 5A-B, 6A-B and 7A-B show examples of controls on a handheld device.
Figure 2B:
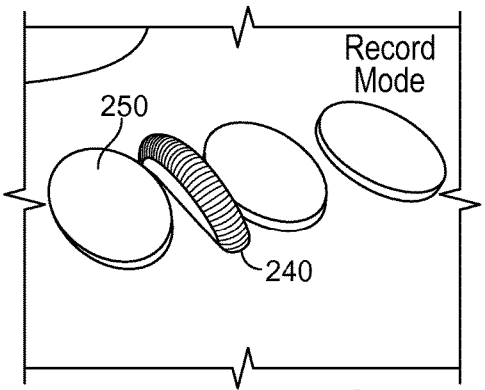

In some implementations, one or more of the controls 200 have different functions depending on the current operating mode of the handheld device. Examples of modes, and corresponding functions, will now be described. FIGS. 2A-B show a "Record" mode. For example, this mode relates to recording images and/or video in one or more ways. Here, the button 210 generates a Play or Pause Action command. For example, video output generated by any of the virtual cameras 114 can be played or paused. The ring 220 here provides random access to video content or any other image sequence. For example, the up position 220 navigates to the first frame, the down position 220 to the last frame, the left position 220 reverses in the frame sequence (more quickly if the button is held), and the right position 220 forwards in the frame sequence (more quickly if the button is held). The buttons 230 generate other commands or control functions. For example, the left button 230 and the right button 230 are used to define or select a subset of the image sequence (e.g., for cutting or copying) by specifying the current frame as a start frame or an end frame, respectively. The down button 230 is used to toggle between the Record mode and Fly mode (which is exemplified below). The up button 250 is used to open or close a menu for the Record mode.

In some implementations, one or more of the controls 200 can perform more than one function in the same mode depending on the manner of pressing or activating the control, such as whether the control is double clicked or held down. For example, double clicking the up button 250 can instead open or close a Scene/Snapshot browser, which can be part of a Playback mode (exemplified below).

The wheel 240 can be rotated in either direction to scroll between values for discrete or continuous parameters. For example, the wheel 240 can perform lens selection or regulate a focus or zoom of the virtual camera. In some implementations, the wheel 240 can also or instead be clicked. For example, clicking on the wheel 240 can activate a menu (e.g., on a display) with user-selectable choices, such as focus or zoom.

The buttons 250 generate other commands or control functions. For example, the first button 250 can start or stop recording. In some implementations, this can involve recording using a virtual camera, or recording of a physical scene using optics and sensor in the handheld device, or both. The second button 250 can perform a reset action, such as returning to a start frame.

The third button 250 can perform a snapshot function. In some implementations, this can involve taking a snapshot of the virtual scene in its particular current state, or taking a snapshot of a physical scene, or both. The snapshot can be stored in the handheld device and/or in the computer system and can be used for one or more purposes. For example, multiple snapshots can be assembled in a sequence to build a storyboard for a movie project; or a snapshot can later be used to revert the virtual scene and/or the virtual camera(s) to the state it or they had when the snapshot was taken.

Figure 3A:
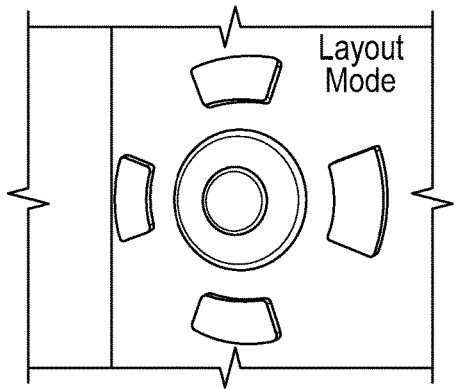
Figure 3B:
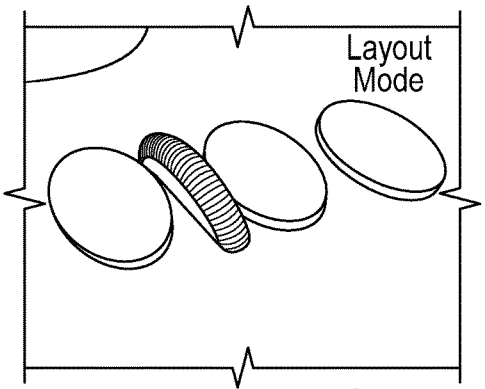

FIGS. 3A-B show a "Layout" mode. In some implementations, this mode relates to creating, maintaining and/or modifying the virtual scene. As such, some of the controls 200 may have the same or similar functions as in the Record mode described above. Other functions may be more or less different. For example, the up button 230 can open or close a menu for the Layout mode.

The wheel 240 is used to choose between different lenses on the virtual camera, or to select a depth value for asset management. For example, when no asset is selected in the virtual scene, scrolling the wheel can alternate between available virtual lenses, and the user chooses a lens by clicking on the wheel. With one or more assets selected, however, the wheel 240 instead moves the asset(s) to a depth closer to or farther from the virtual camera. For example, with reference again to FIG. 1, when any of the assets 112 is selected, the wheel 240 either draws the asset nearer the virtual camera 114 (i.e., to a lower depth) or pushes it further away from the virtual camera (i.e., to a higher depth). The direction of movement for the asset in the other dimensions (e.g., upward/downward or left/right, from the user's view) can be regulated by motion capture of the handheld device (i.e., such that turning the handheld device is translated into a corresponding turn inside the virtual scene) or by navigation controls (e.g., a joystick or arrow keys).

Selection of one or more assets can be done using the first button 250. By pressing the second button 250 the user can bring a selected asset to the user's current location (e.g., a "Here" button). In contrast, when no asset has been selected, pressing the second button 250 can register a corresponding 3D point in the virtual scene. Such a recorded point can be used to mark a location, to act as a placeholder for items, or for later returning the virtual camera to the same location, to name a few examples. The 3D point can be registered using coordinates in any suitable coordinate system.

The third button 250 can be used to set a selected object to remain at a specified location (e.g., a "There" button). The user can place an aiming reticule at a chosen location in the view of the virtual scene using the wheel 240 and/or motion capture, and pressing the third button 250 places the selected asset(s) at the chosen location. If no asset is selected, the location of the aiming reticule is registered as a 3D point.

In the above description of the Layout mode, assets are used as an example of something the user can manipulate in the virtual scene. In some implementations, the user can also or instead manipulate one or more other features, such as a character or the layout 108 (FIG. 1), and/or configure abstract aspects of the virtual scene, such as rules or forces that are applied to objects.

Figure 4A:
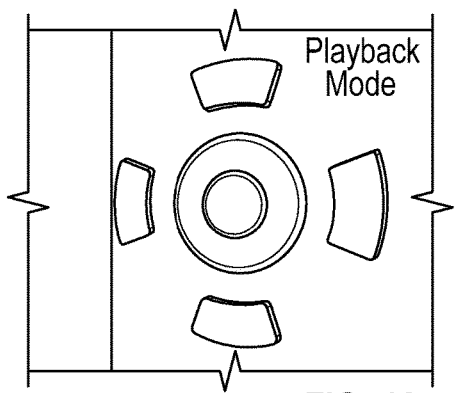
Figure 4B:
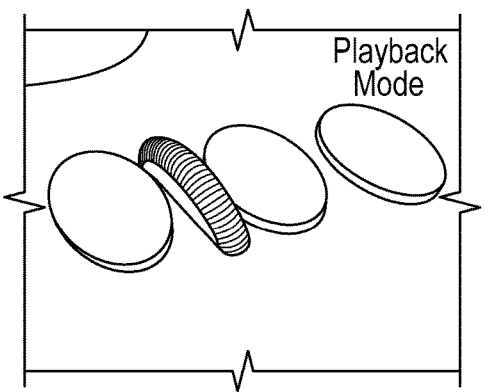

FIGS. 4A-B show a "Playback" mode. In some implementations, this mode relates to playing or otherwise presenting recorded images, for example a video. Some of the controls 200 may have the same or similar functions as above, and other functions may be different. For example, the button 210 can play or pause the recording (e.g., a video sequence). The down button 250 can open a menu for the Playback mode, such as a scene browser that can let the user review a library of multiple recorded scenes. The up button 250 can open a menu, such as a playback menu where various settings applying to the playback can be specified.

The wheel 240 can be used to choose between (by scrolling) and select (by clicking) recorded scenes, for example in the scene browser. The first and second buttons 250 are used to page forward and backward, respectively, among scenes in the library. The third button 250 can be used to perform another function regarding one or more selected scenes, such as deleting the scene(s).

Figure 5A:
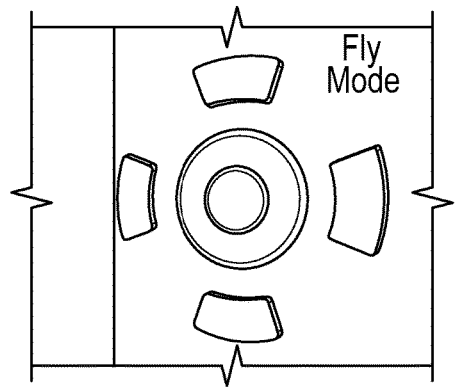
Figure 5B:
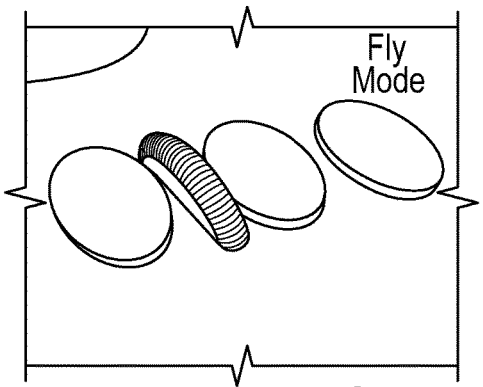

FIGS. 5A-B show a "Fly" mode. In some implementations, this mode relates to maneuvering a virtual camera in the virtual space to capture images or video clips. The button 210 is used to attach the virtual camera to an object (e.g., to an asset, a character or other item in the virtual scene). The virtual camera is moved to the object and a temporary association is created so that the virtual camera undergoes the same or similar movement as the object. For example, a moviemaker or other user may wish to have the camera travel around the virtual scene to quickly get an overview of it. The user can then attach the virtual camera to a suitable object that is know or expected to travel through the area(s) of interest. For example, when one of the assets 112 or the character 114 (FIG. 1) is moving through the layout 108 (FIG. 1), a virtual camera attached to the object can show a quick overview on the display of the covered areas. The attachment of the virtual camera to the object can be removed if the camera is instead attached to another object, or if the camera is freed from the object, in which case the camera will remain at its current location (until it is moved). Such inputs can be made by double clicking on the button 210 or by selecting a command in an onscreen menu.

The ring 220 provides for camera movement based on input controls. For example, the up and down positions cause the virtual camera to be translated forward and backward, respectively. Similarly, the left and right positions cause the virtual camera to be translated to the left and right, respectively. In some implementations, the up and down positions can alternatively translate the virtual camera upward or downward, respectively. For example, holding the up or down position of the ring 220 while scrolling the wheel 240 can trigger up or down movement of a magnitude corresponding to the amount that the wheel is turned. In some implementations, the first and second buttons 250 can translate the virtual camera back or forward, respectively, similar to the up and down positions.

The movement in the Fly mode can be useful in a motion-tracked implementation, for example. That is, suppose that the user is holding the device 102 (FIG. 1) and is currently viewing a particular location in the virtual scene 104 while the handheld device is being motion captured. The user can employ the motion capture to navigate through the layout, either by moving the handheld device while standing still or by walking around while holding the device.

These movements will trigger corresponding translation of the virtual camera. However, if the user wishes to visit a virtual location far away in a widespread layout, it may be necessary to move the device significantly, which can be inconvenient or difficult for the user. The user can then instead employ the control-based camera relocation to simply move (in a sense, "fly") to the different place in the virtual scene without moving the handheld device.

The buttons 230 provide other functions. In some implementations, the right and left buttons 230 are used to navigate to a next or previous bookmark, respectively. For example, bookmarks can be particular positions marked in the current version of the virtual scene (e.g., by recorded 3D points). As another example, the bookmarks can include one or more other states of the virtual scene where the layout, characters, assets, or applicable rules/logic differ in some way. Such other states may have been captured as snapshots. By navigating to a bookmarked virtual scene, the moviemaker can check correlation or consistency between scenes, or move or otherwise manipulate characters or assets, to name just a few examples.

The down button 230 is used to toggle between the Record mode above and a Transform mode (to be exemplified below). The up button 230 can open a menu, such as a fly menu where various settings applying to relocation of the virtual camera can be set. For example, the speed of translation can be specified.

Figure 6A:
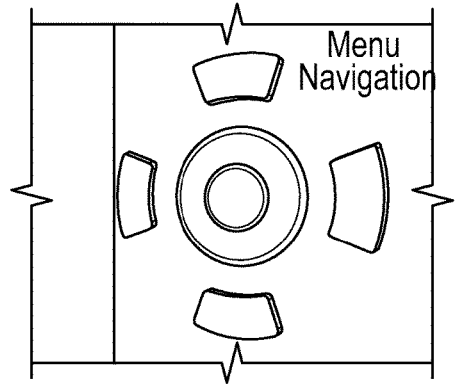
Figure 6B:
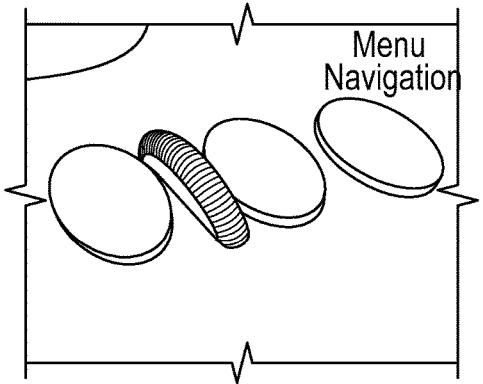

FIGS. 6A-B show a "Menu Navigation" mode. In some implementations, one or more menus can be presented on the display, and the controls 200 can then be used to navigate in or between the menus. The button 210 here is used to select a chosen menu option, which can for example correspond to making a command, performing an action or entering a value for a parameter. The ring 220 is used for moving within a particular menu: The left and right positions cause the next command/action/value to the left or right in the menu, respectively, to be selected. For example, after such a selection is made, the user can effectuate the selection using the button above or below, respectively, to be selected. Similarly, the up and down positions cause the next command/action/value above or below in the menu, respectively, to be selected.

The left and right buttons 230 are used for paging back and forward, respectively, in a menu. For example, when a menu is distributed over multiple pages or screens, the left and right buttons can be used to move between pages.

The down button 230 has no function mapped to it in the illustrated embodiment, but the button could be mapped to any available function(s). In some implementations, this applies to all illustrated buttons or controls. That is, the function layout shown herein can be an example of mapping a general set of functions to useful places. The up button 230 is used to open a current menu.

The wheel 240 is used to scroll among options in a menu. The first and second buttons 250 can be used for paging within a menu, similar to the left and right buttons 220. The third button 250 can be used to delete a selected item or undo a selection.

Figure 7A:
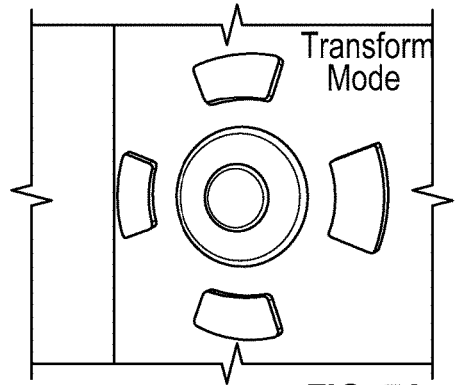
Figure 7B:
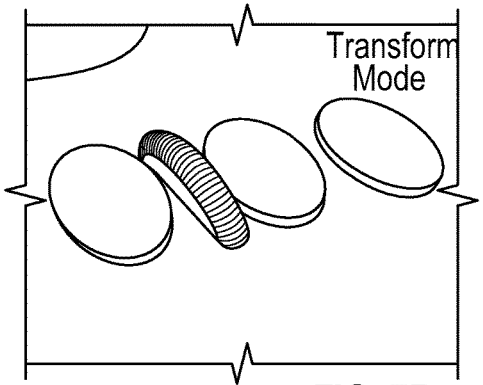

FIGS. 7A-B show a "Transform" mode. In some implementations, a selected object can be transformed in one or more regards. For example, the transformation axes (such as translation, rotation and scale) can be modified. Here, the button 210 is used to select or drag a particular axis for the object. For example, a selected existing transformation axis can be dragged while pressing this button to change the axis. The left and right buttons 220 decrease or increase, respectively, the amount of transformation along an X-axis. Similarly, the up and down buttons 220 increase or decrease, respectively, the amount of transformation along a Y-axis. The same function can be performed using the wheel 240.

The first and second buttons 250 increase or decrease, respectively, the amount of transformation along a Z-axis. If the user holds the up or down buttons 220, the amount of transformation along the Z-axis can instead be set using the wheel 240. The third button 250 has no function mapped to it in the illustrated embodiment, but the button could be mapped to any available function(s).

Figure 8:
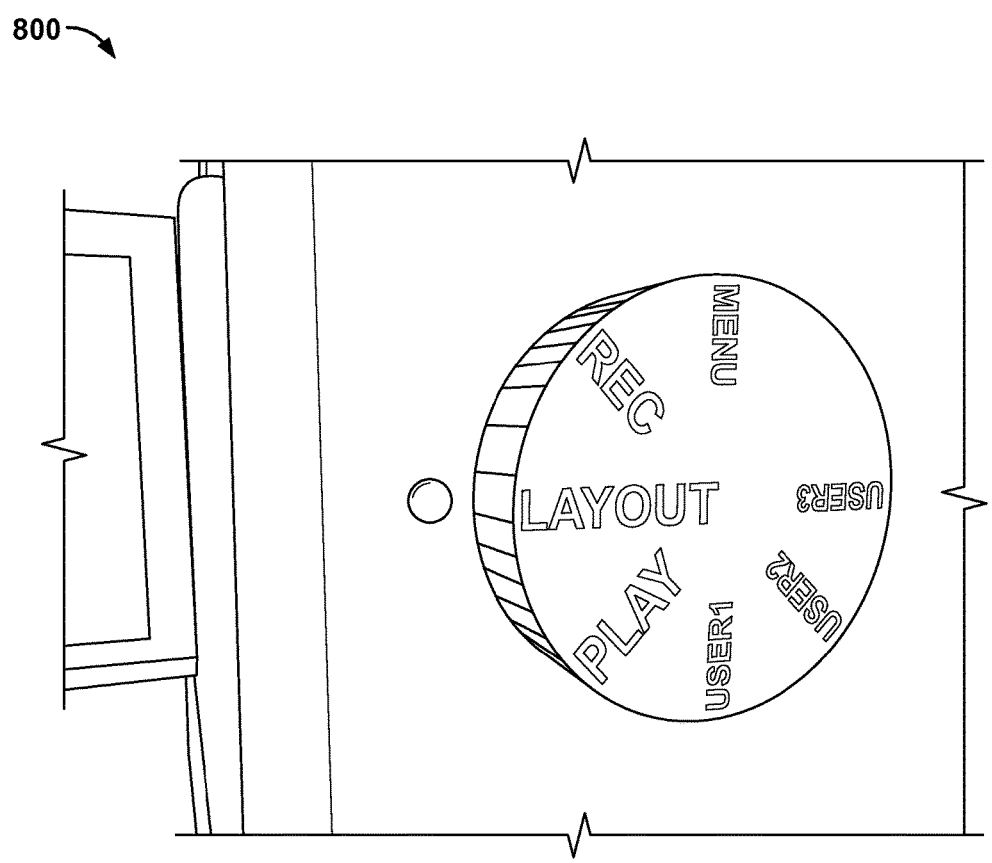
FIG. 8 shows an example of a mode control on a handheld device.

FIG. 8 shows an example of a mode control 800 on a handheld device. The mode control here includes a wheel that the user can register against any of multiple positions, each position corresponding to a different mode, function or option. For example, the mode control 800 here includes Menu, Rec, Layout and Play modes, and also three presets: User1, User2 and User3.

The modes can correspond to the different functions of the handheld device, such as to record or playback images or video, or to laying out the virtual scene and making changes therein. The user presets can correspond to customized settings of the handheld device, the computer system and/or the virtual scene. For example, different users can choose and preset their personal preferences.

Figure 9:
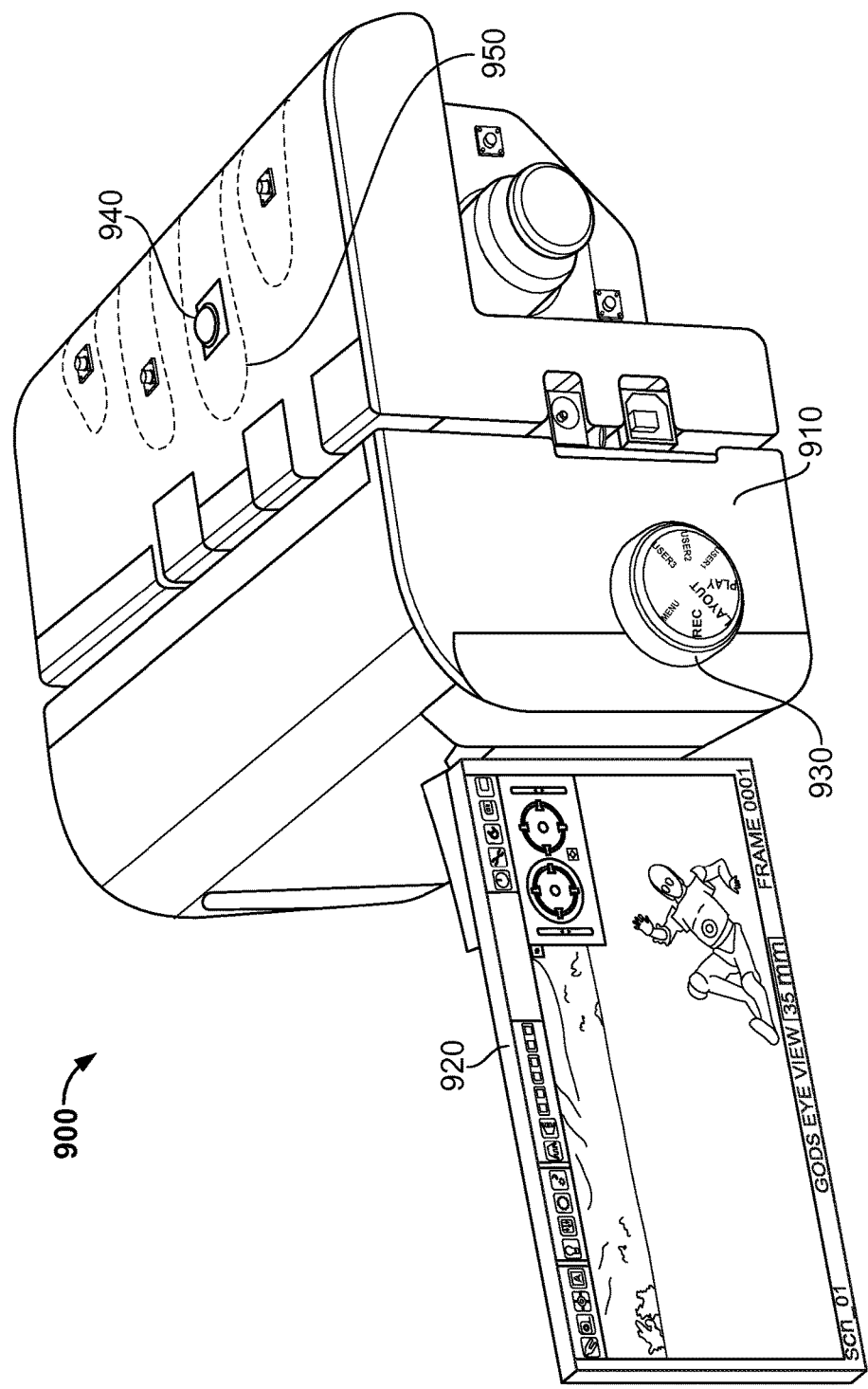
FIGS. 9-10 show another example of a handheld device for controlling a virtual scene.
Figure 10:
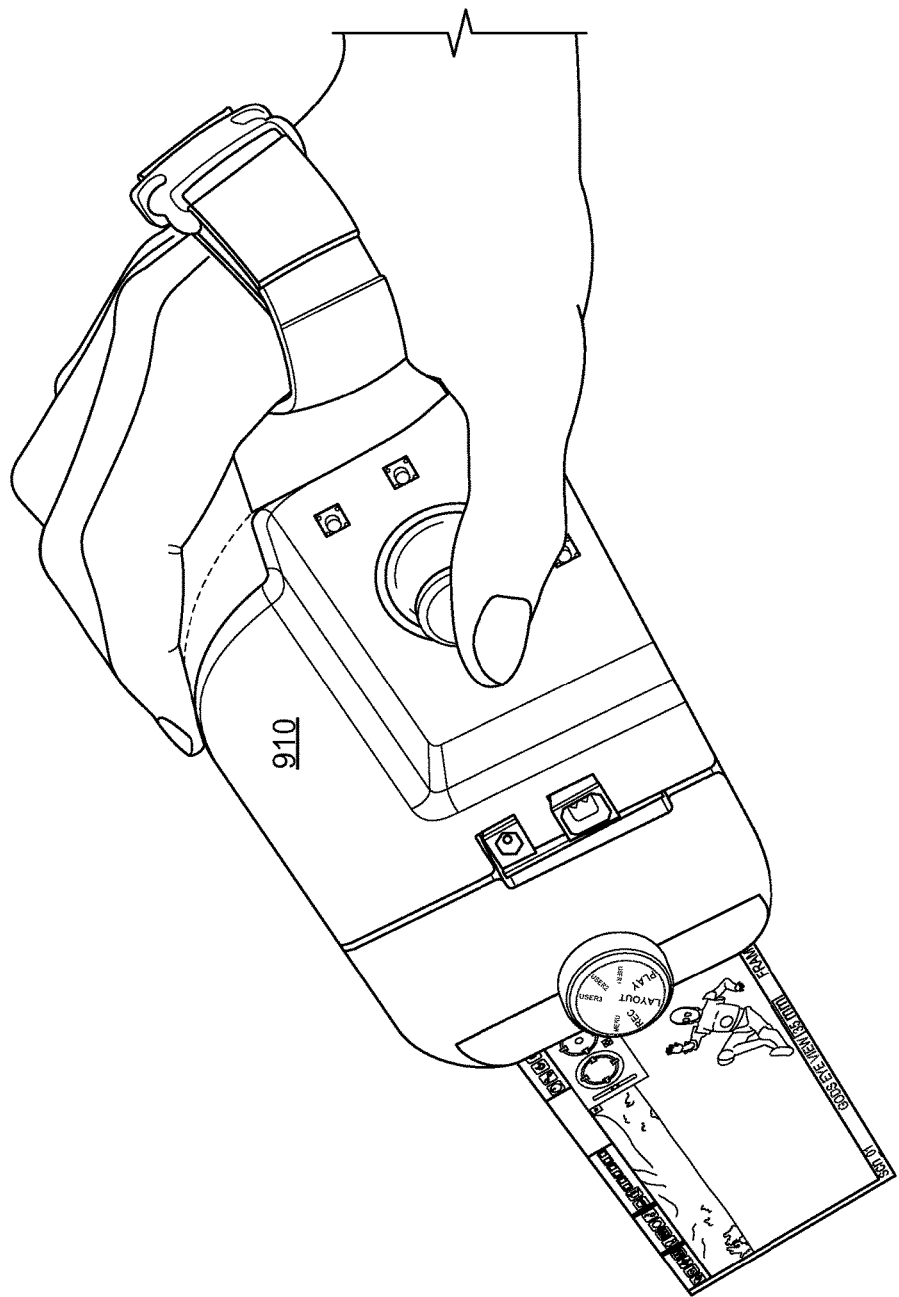

FIGS. 9-10 show another example of a handheld device 900 for controlling a virtual scene. The handheld device 900 may function similarly to the handheld device 102 (FIG. 1) in some aspects. Here, the handheld device includes a housing 910 having a display 900 that can be folded in and out. The handheld device has a mode control 930 for choosing among modes and/or presets. Controls 940 (e.g., one or more buttons and/or scroll wheels) are used for managing the functions of the handheld device and to control and manipulate the virtual scene and virtual camera. Here, some of the controls 940 are located on the side of the handheld device where the user's hand is expected to hold the device when in use, as shown in FIG. 10. For example, one or more finger indentations 950 can be formed in the housing 910 to provide a more secure and comfortable grip. One or more of the controls 940 can be located in or near such an indentation.

Figure 11A:
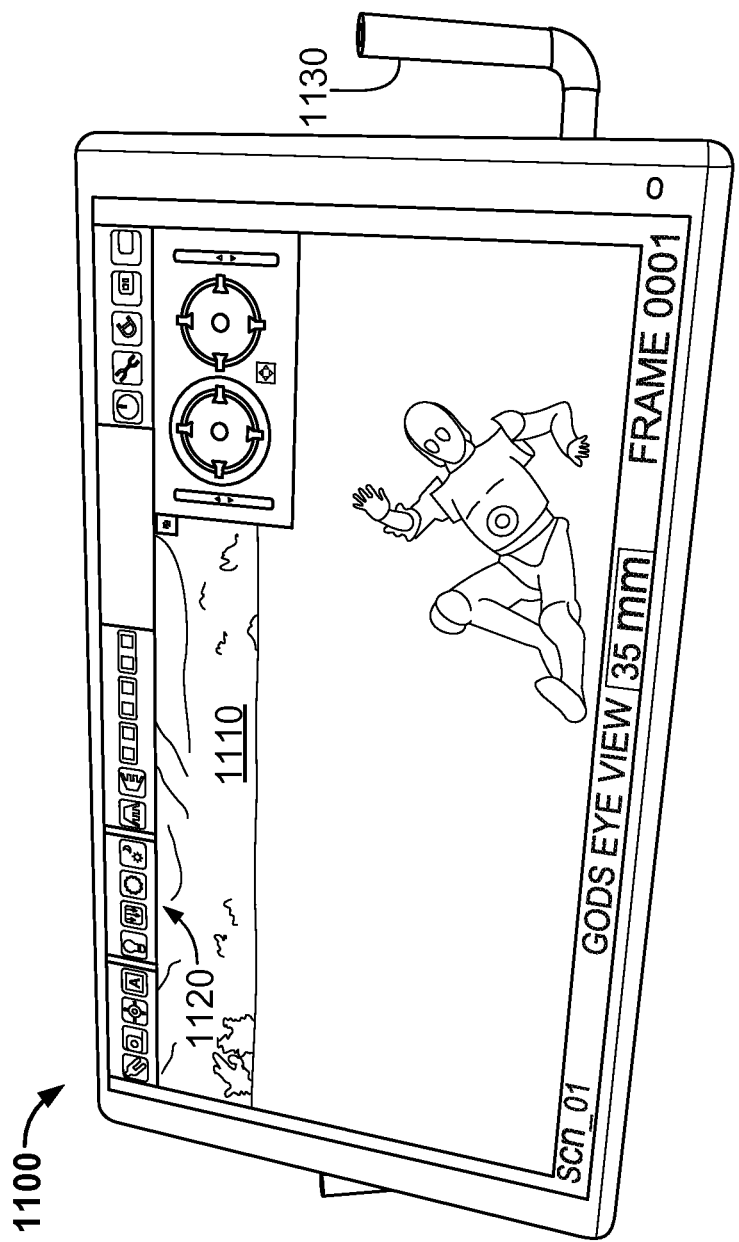
FIGS. 11A-B and 12 show other examples of handheld devices for controlling a virtual scene.
Figure 11B:
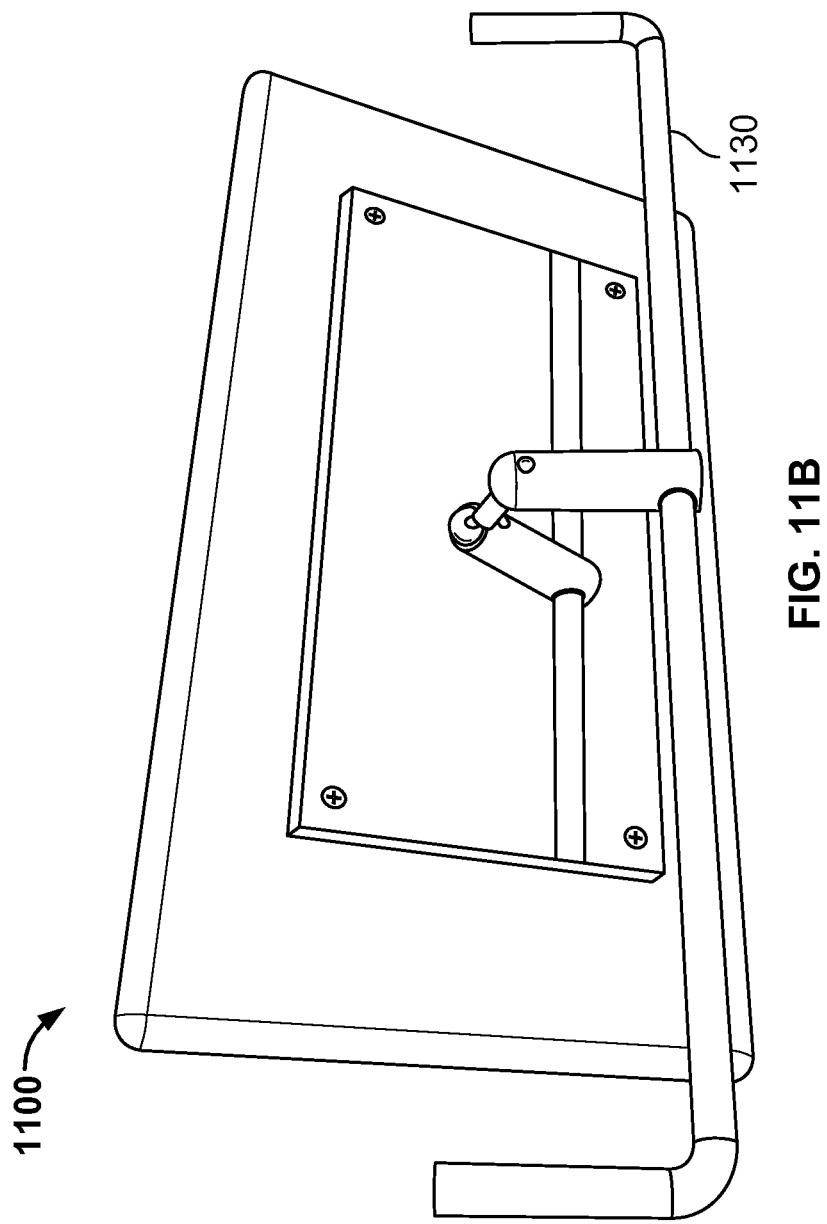
Figure 12:
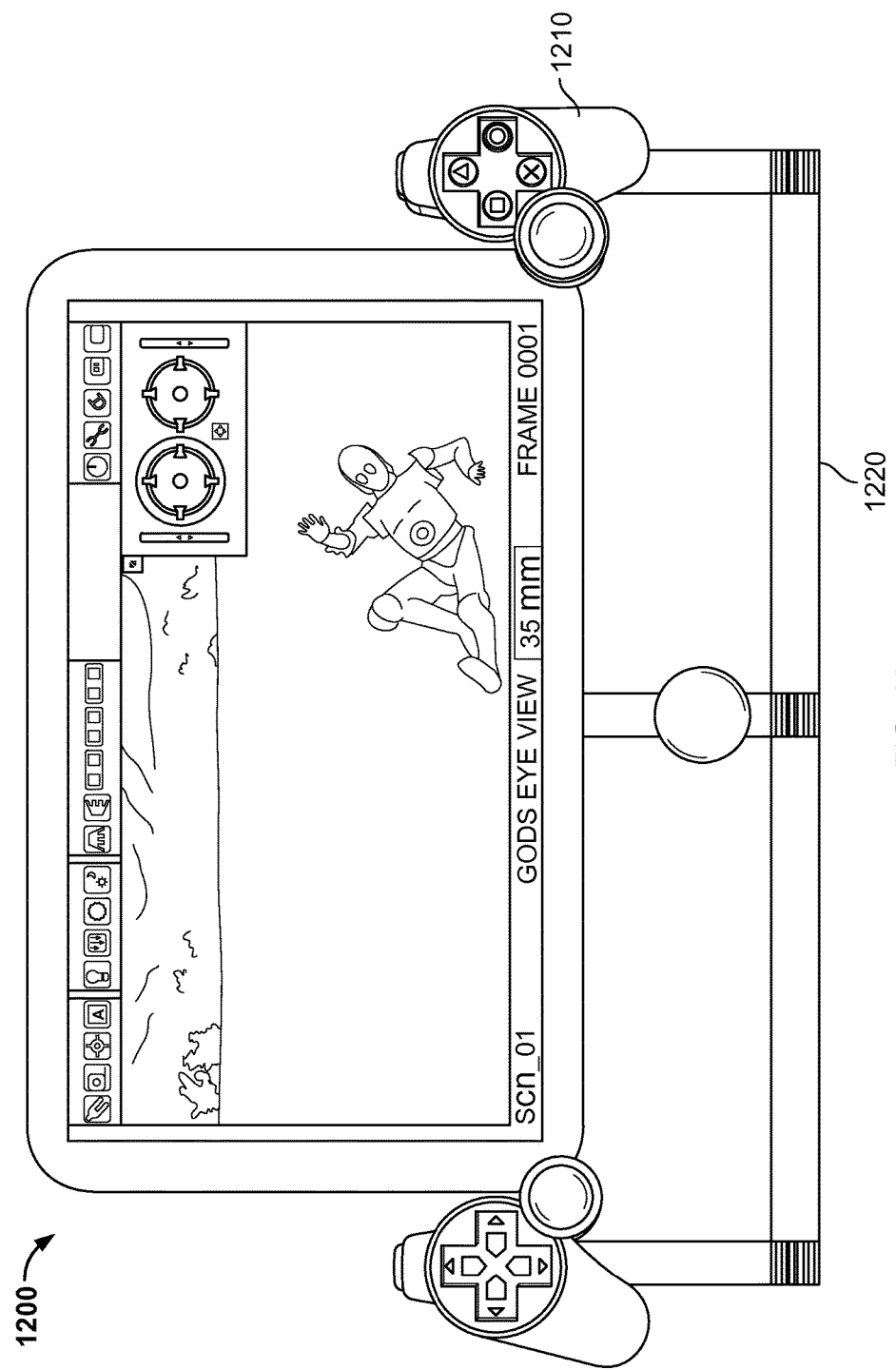

FIGS. 11A-B and 12 show other examples of handheld devices 1100 and 1200 for controlling a virtual scene. Here, both the devices 1100 and 1220 have essentially a tablet form factor. For example, the handheld devices have a generally flat configuration with a display 1110 covering a substantial part of one of the major surfaces. The display 1110 can have touchscreen functionality such that the user enters commands and interacts with the device by selecting options on the screen.

In some implementations, one or more virtual buttons 1120 can be defined on the display. For example, the buttons can correspond to functions that are available in the application or other software that generates the virtual scene, and the user employs the button(s) to effectuate or inhibit those functions, as applicable. In addition to, or instead of, the virtual buttons, the handheld device 1100 or 1200 can have one or more mechanical controls (e.g., in analogy with the controls 124, 200 or 940 mentioned above. For example, the housing of the handheld device 1100 or 1200 can have one or more buttons, scroll wheels or finger indentations.

The handheld devices 1100 and 1200 can be motion captured. For example, the handheld device can have a motion tracking device such as an accelerometer or any other suitable sensor. As another example, an external tracking system can track the handheld device, such as using optical or audio signals. Similar to the description above of other examples of devices, the captured motion can be used to control the operation, location and/or movement of virtual cameras.

Here, the handheld device 110 includes a handle 1130 attached to a body of the device. In some implementations, the handle is attached at the back of the device and includes handles that the user reaches from the opposite side of the device. For example, the handle 1130 can include a bar extending along a main axis of the device, the bar mounted to the housing with a swivel or a hinge. The bar can include a handle at one or both ends, the handle(s) configured to be held by the user's hand while the device is in use (e.g., while the display is facing the user).

The handheld device 1200 includes mechanical controls 1210 mounted on a support 1220 which is attached to the housing. Here, the controls 1210 include buttons, joysticks and other input controls with which the user controls the device, and thereby the virtual camera(s) and the virtual scene. In some implementations, the controls 1210 are shaped as a pistol-like grip, analogous to a game controller, so that the user can support the device and operate the controls without repositioning either hand. The support 1220 can be attached to the back of the device and can include one or more swivels or hinges.

While a handheld device is described in examples above, the device in some implementations is not restricted to handheld use only. For example, the device can also be removably placed on, or attached to, any suitable type of mount. Examples of mounts that can be used include, but are not limited to, a tripod, a fluid head, a remote pan/tilt head, a crane, and combinations thereof.

Figure 13:
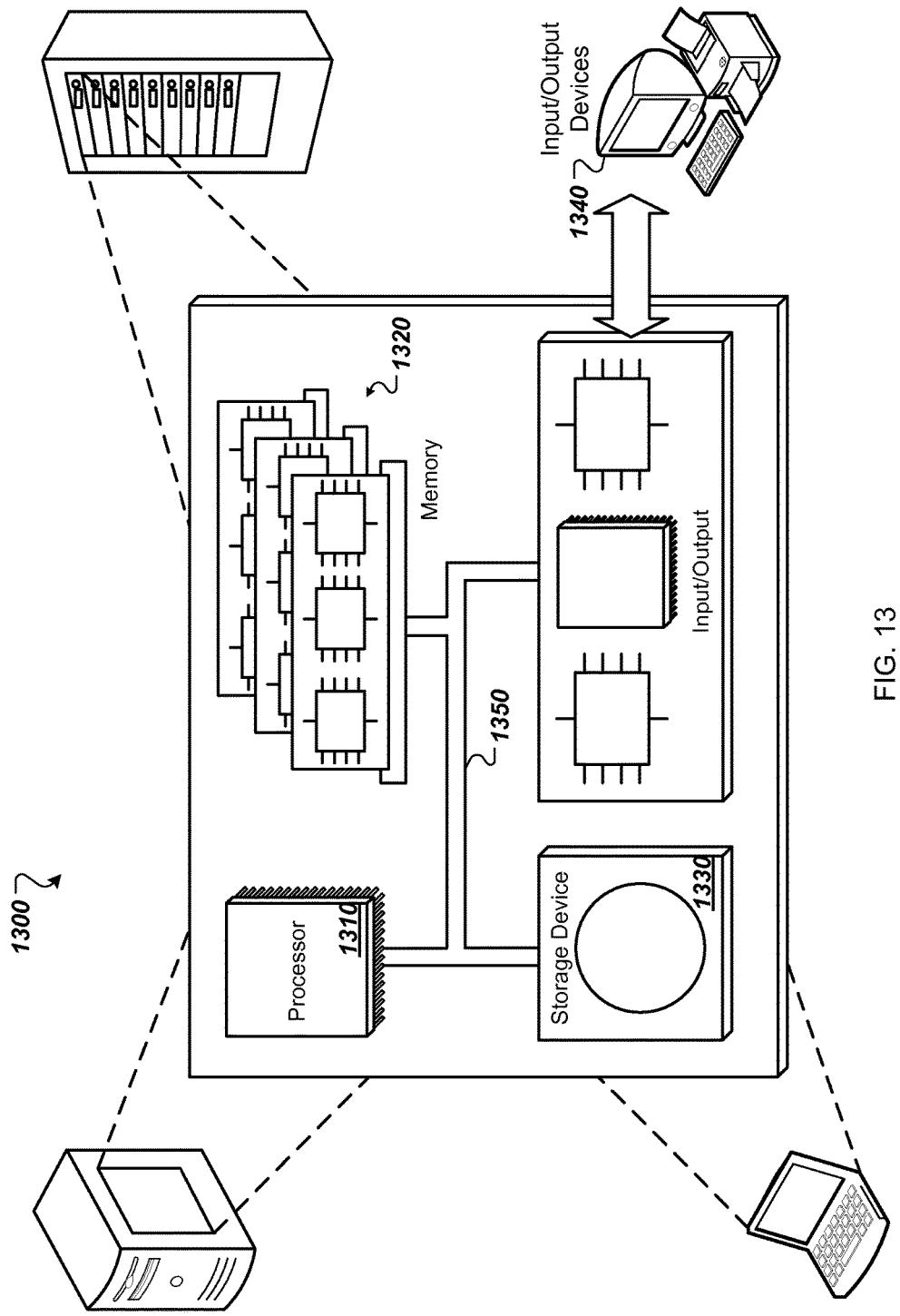
FIG. 13 is a block diagram of a computing system that can be used in connection with computer-implemented methods described in this document.

FIG. 13 is a schematic diagram of a generic computer system 1300. The system 1300 can be used for the operations described in association with any of the computer-implement methods described previously, according to one implementation. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In some implementations, the memory 1320 is a computer-readable medium. The memory 1320 is a volatile memory unit in some implementations and is a non-volatile memory unit in other implementations.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A handheld device that allows a user to control a virtual scene generated by a computer system, the virtual scene including one or more characters, a plurality of non-character assets and at least one virtual camera, the plurality of assets including one or more immoveable objects, moveable objects or self-propelled objects, the handheld device comprising:
  a body;
  an I/O channel configured to enable the handheld device to communicate with the computer system that generates the virtual scene;
  a display mounted on the body and configured to show a representation of the virtual scene as generated by the at least one virtual camera; and
  one or more input controls operable to enable: (a) a first user-selected mode for recording images with a virtual camera of the at least one virtual camera in the virtual scene using the input controls, and (b) a second user-selected mode for selecting individual ones of the plurality of assets and moving the selected assets within the virtual scene and for selecting between different virtual lenses for the virtual camera.

2. The handheld device set forth in claim 1 wherein the one or more input controls comprises at least one scroll wheel that, when an asset is not selected, allows the user to alternate between available virtual lenses by scrolling the wheel and then select a lens by clicking on the wheel.

3. The handheld device set forth in claim 2 wherein the one or more input controls further comprises a first button that allows the user to select individual ones of the plurality of assets.

4. The handheld device set forth in claim 3 wherein the one or more input controls further comprises a second button that allows the user to move a selected asset to the user's current location.

5. The handheld device set forth in claim 4 wherein the one or more input controls further comprises a third button that allows the user to set a selected object to a location in the virtual scene that can be set by the user by placing a reticle at the location.

6. The handheld device set forth in claim 1 wherein the one or more input controls comprises at least one scroll wheel that, when an asset is selected, moves the asset to a depth closer to or further from the at least one virtual camera.

7. The handheld device set forth in claim 6 wherein a direction of movement of the selected asset in dimensions other than the depth from the at least one virtual camera can be regulated by movement of the handheld device.

8. The handheld device of claim 1 wherein the one or more input controls are further operable to, after the asset has been selected, enable a user to move the asset closer to and further from the virtual camera as well as left and right and up and down within the virtual scene.

9. The handheld device of claim 1 wherein the one or more input controls are further operable to place the handheld device into a third mode in which the input controls enable a user to attach a virtual camera to an object in the virtual scene such that the camera moves to the object and a temporary association is created so that the virtual camera undergoes the same or similar movement as the object.

10. A handheld device that allows a user to control a virtual scene generated by a computer system, the virtual scene including one or more characters, a plurality of non-character assets and at least one virtual camera, the plurality of assets including one or more immoveable objects, moveable objects or self-propelled objects, the handheld device comprising:
  a body having a camera form factor including a lens-like portion and a rotatable lens ring coupled to the lens-like portion;
  an I/O channel configured to enable the handheld device to communicate with the computer system that generates the virtual scene;
  input controls positioned on the body;
  a display mounted on the body and configured to show a representation of the virtual scene as generated by the at least one virtual camera; and
  a mode selection input control operable to place the handheld device into a first mode in which the handheld device is configured to enable the user to record images with a virtual camera of the at least one virtual camera in the virtual scene using the input controls, and a second mode in which the handheld device is configured to enable the user to use the input controls to select individual ones of the plurality of assets and move the selected assets within the virtual scene and to select between different virtual lenses for the virtual camera.

11. The handheld device of claim 10 wherein the rotatable lens ring enables control of focus length of the virtual camera.

12. The handheld device of claim 10 wherein the input controls further include motion sensors that enable a selected asset to be moved left/right and up/down within the virtual scene.

13. The handheld device of claim 10 wherein the input controls are further configured to allow a user to place an aiming reticle at a chosen location in the virtual scene, and include a control that can be selected to place the selected asset at a location identified by the aiming reticle.

14. The handheld device of claim 10 wherein the mode selection input control is further operable to place the handheld device into a third mode in which the input controls enable a user to attach a virtual camera to an object in the virtual scene such that the camera moves to the object and a temporary association is created so that the virtual camera undergoes the same or similar movement as the object.

15. A handheld device that allows a user to control a virtual scene generated by a computer system, the virtual scene including a plurality of virtual assets and at least one virtual camera, the handheld device comprising:
  a body;
  an I/O channel configured to enable the handheld device to communicate with the computer system that generates the virtual scene;
  a display mounted on the body and configured to show a representation of the virtual scene as generated by the at least one virtual camera; and
  an input control operable to enable (a) a first user selected mode for recording images with a virtual camera of the at least one virtual camera in the virtual scene, and (b) a second user selected mode for selecting between different virtual lenses for the virtual camera;

wherein the input control comprises a scroll wheel that, when a virtual asset is not selected, allows the user to alternate between available virtual lenses by scrolling the wheel and then select a virtual lens by clicking on the wheel.

16. The handheld device set forth in claim 15 wherein the input control comprises a first button that allows the user to select individual ones of the plurality of virtual assets.

17. The handheld device set forth in claim 16 wherein a direction of movement of a selected asset in different dimensions from the at least one virtual camera can be regulated by movement of the handheld device.

18. The handheld device of claim 15 further comprising at least one virtual button configured to be presented on the display, the virtual button configured to control an aspect on an application program that generates the virtual scene including the plurality of virtual assets and the virtual camera.

19. The handheld device of claim 15 wherein the display comprises a touchscreen that enables a user to control or modify the plurality of virtual assets or the virtual camera included in the virtual scene.

* * * * *